United States Patent
Steele

(10) Patent No.: US 9,720,698 B2
(45) Date of Patent: Aug. 1, 2017

(54) METHOD AND DEVICE FOR INCREASED BOOT SEQUENCE SPEED USING A CACHE IN NON-VOLATILE MEMORY

(71) Applicant: Insyde Software Corp., Taipei (TW)

(72) Inventor: Kelly E. Steele, Beaverton, OR (US)

(73) Assignee: Insyde Software Corp., Taipei (TW)

( * ) Notice: Subject to any disclaimer, the term of this patent is extended or adjusted under 35 U.S.C. 154(b) by 70 days.

(21) Appl. No.: 14/271,767

(22) Filed: May 7, 2014

(65) Prior Publication Data
US 2014/0337609 A1 Nov. 13, 2014

Related U.S. Application Data

(60) Provisional application No. 61/820,438, filed on May 7, 2013.

(51) Int. Cl.
*G06F 9/00* (2006.01)
*G06F 9/44* (2006.01)

(52) U.S. Cl.
CPC .................... *G06F 9/4401* (2013.01)

(58) Field of Classification Search
CPC .............................. G06F 9/4408; G06F 9/4401
USPC ............... 711/113, 103, 104; 713/2; 710/316
See application file for complete search history.

(56) References Cited

U.S. PATENT DOCUMENTS

| | | | | |
|---|---|---|---|---|
| 6,539,456 B2* | 3/2003 | Stewart | ................. | G06F 9/4401 711/113 |
| 6,968,450 B1* | 11/2005 | Rothberg | .............. | G06F 3/0607 711/113 |
| 7,181,608 B2* | 2/2007 | Fallon | ................... | G06F 3/0613 711/113 |
| 8,082,433 B1* | 12/2011 | Fallone | ................ | G06F 9/4401 365/215 |
| 8,423,754 B2* | 4/2013 | Lee | ........................ | G06F 9/4401 713/2 |
| 8,874,887 B2* | 10/2014 | Mruthyunjaya | ....... | G06F 9/4401 711/104 |
| 2009/0077368 A1* | 3/2009 | Depta | ................... | G06F 9/4401 713/2 |
| 2010/0077194 A1* | 3/2010 | Zhao | ..................... | G06F 9/4401 713/2 |
| 2011/0197017 A1* | 8/2011 | Yu | ........................ | G06F 12/0246 711/103 |
| 2011/0252178 A1* | 10/2011 | Wang | .................... | G06F 3/0607 710/316 |
| 2012/0239918 A1* | 9/2012 | Huang | .................. | G06F 9/4401 713/2 |
| 2012/0239921 A1* | 9/2012 | Fallon | ................... | G06F 3/0613 713/2 |
| 2012/0260079 A1* | 10/2012 | Mruthyunjaya | ...... | G06F 9/4401 713/2 |

(Continued)

*Primary Examiner* — Aurel Prifti
(74) *Attorney, Agent, or Firm* — McCarter & English, LLP; John S. Curran

(57) ABSTRACT

An OS bootloader or other code or data requested by firmware during a boot sequence is cached inside ROM or another non-volatile memory location. Firmware uses this cached version, instead of retrieving the OS bootloader or other code from a peripheral location to speed up the boot sequence. Embodiments also create additional room in the cache based on pre-determined rules if the cache doesn't already include the requested data and doesn't have enough room to store the requested data at the time of the firmware's read request.

18 Claims, 4 Drawing Sheets

(56) References Cited

U.S. PATENT DOCUMENTS

| | | | |
|---|---|---|---|
| 2013/0042098 A1* | 2/2013 | Baik | G06F 9/4401 713/2 |
| 2014/0215199 A1* | 7/2014 | Ma | G06F 9/4406 713/2 |
| 2014/0325197 A1* | 10/2014 | Lewis | G06F 9/4418 713/2 |
| 2015/0154031 A1* | 6/2015 | Lewis | G06F 9/4406 713/2 |

* cited by examiner

METHOD AND DEVICE FOR INCREASED BOOT SEQUENCE SPEED USING A CACHE IN NON-VOLATILE MEMORY

RELATED APPLICATION

This application is related to, and claims the benefit of, U.S. Provisional Patent Application No. 61/820,438, entitled "Read-Only OS Bootloader Caching in Non-Volatile Memory", filed May 7, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which invokes an OS bootloader that loads an operating system for the computing device into memory. Once loaded, the operating system is in charge of normal operation of the computing device although the provision of certain services after loading of the operating system may require a transition of control from the operating system back to the firmware for security reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier OS/firmware interfaces previously used by the industry and commonly known as legacy BIOS (Basic Input/Output System).

When implemented in a computing device, the machine codes for UEFI firmware (or older types of firmware) and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

The boot sequence performed by the firmware in a computing device may include a "Power On Self Test", also known as POST. During POST, the firmware performs a sequence of steps prior to proceeding to attempt to load the OS. POST includes routines to set an initial value (state) for internal and output signals for components of the computing device and to execute tests, as determined by the device manufacturer. POST in other words verifies that the tested components of the computing device are functioning correctly before continuing the boot sequence and attempting to load the operating system.

BRIEF SUMMARY

Embodiments of the present invention cache an OS bootloader or other code or data needed by firmware during a boot sequence inside ROM or another non-volatile memory location. Firmware uses this cached version instead of retrieving the OS bootloader or other code from a peripheral location to speed up POST. Embodiments also create additional room in the cache based on pre-determined rules if the cache doesn't already include the requested data and doesn't have enough room to store the requested data at the time of the firmware's read request.

In one embodiment, a method for increasing speed of a boot sequence in a computing device begins a firmware executed boot sequence for the computing device and identifies a read request for data located on a read-only disk during the boot sequence. The method also determines whether a cache exists in non-volatile memory that corresponds to the requested disk and determines, when the corresponding cache has been determined to exist, whether the requested data is in the corresponding cache. The method also retrieves, with the firmware, when the requested data has been determined to be in the corresponding cache, the requested data from the corresponding cache instead of from the requested disk. The retrieved data is used in executing the boot sequence.

In another embodiment, a computing device includes non-volatile memory holding a cache corresponding to a read-only disk holding data used during a boot sequence for the computing device. The computing device also includes firmware that executes a boot sequence for the computing device. The boot sequence identifies a read request for data located on the read-only disk during the boot sequence. The boot sequence also determines whether a corresponding cache exists and determines, when the corresponding cache has been determined to exist, whether the requested data is in the corresponding cache. The boot sequence retrieves, when the requested data has been determined to be in the corresponding cache, the requested data from the corresponding cache instead of from the requested disk. The retrieved data is used in executing the boot sequence.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

When a computing system goes thru a POST, there are a few areas that take most of the time used to POST. One of these areas is the system reading in the OS bootloader code/data from slower optical media. The delay stems from having to wait for the disk media to start spinning at speed. A similar issue exists with other media that take extra time to access like tape drives. While not a major concern with PCs which frequently conduct their boot sequence entirely without having to access peripheral drives, for embedded or other systems that boot from an optical disk or other media, the access delay can be significant. Additionally, the same concern exists for PCs that boot from an alternate boot device such as an optical drive.

Figure 1:
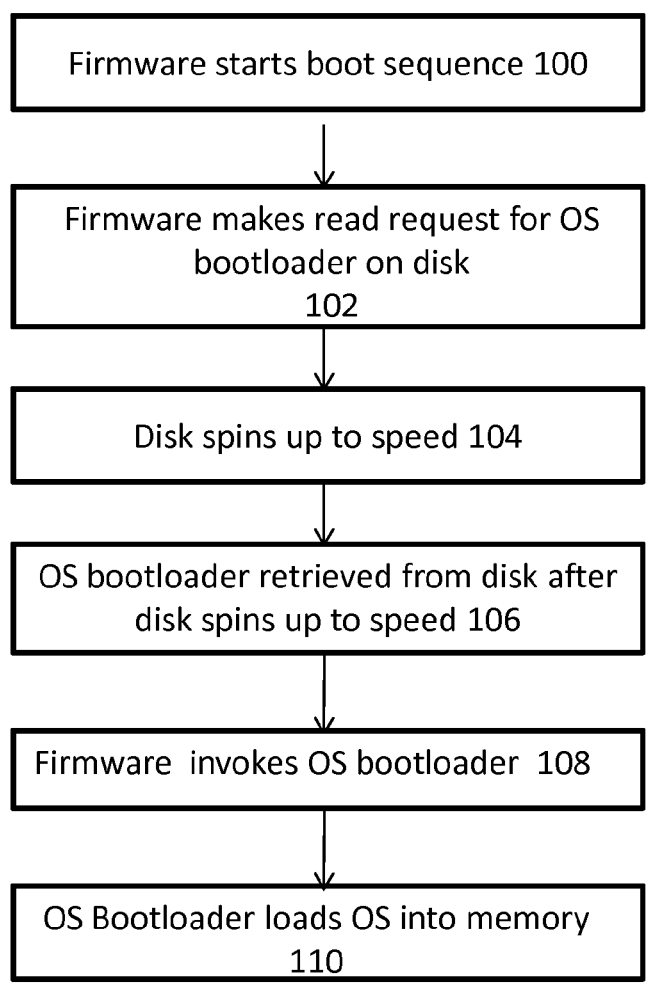
FIG. 1 (prior art) depicts an exemplary sequence of steps performed to retrieve OS bootloader code/data during a boot sequence.

FIG. 1 depicts an exemplary conventional sequence of steps performed to retrieve OS bootloader code/data during a boot sequence. The sequence begins as firmware starts a boot sequence following reset (step 100). The firmware execution results in a read request for code or data for an OS bootloader (step 102). The disk on which the requested data then starts to spin up to speed (step 104). After the disk is up to speed, the OS bootloader code/data is retrieved from the disk (step 106). The retrieved OS bootloader is invoked by the firmware (step 108) and the OS bootloader loads the OS into memory (step 110).

Embodiments of the present invention speed up the hand-off from the firmware to the OS by caching the code/data that is used by the firmware in non-volatile memory where the code/data can be accessed while waiting for the media to come up to speed. For example, in an embodiment the code/data may be cached in system ROM. Since the OS is Read-Only, there are no coherency issues to be dealt with unless the end-user changes the media the OS is on. If the media is changed, the end-user can either trigger the cache update in a manual way or the cache can be auto-updated upon detection of OS media change. This auto-detection may be performed by comparing the disk Universal Unique Identifier (UUID), checking for a disk-change status bit, or similar methods. The speed increase experienced by embodiments of the present invention comes from the fact that the media is slow to spin up and that there are several areas of data that get read multiple times (such as the Master Boot Record (MBR) and partition table). The embodiments of the present invention optimize these areas of data by reading from a cache in these instances. The OS Bootloader may also benefit from the cache until it takes over reading the media itself.

The use of the cached OS bootloader code/data instead of retrieving it from the optical media can provide significant time savings. For example, without caching, an exemplary POST may take ~23.25 seconds. In contrast, in tests of embodiments of the present invention, the time savings have been significant. For example, when the OS bootloader code/data was retrieved from a 1 MB cache in ROM , POST took ~21.13 seconds. The time savings were greater with larger cache sizes. When the OS bootloader code/data was retrieved from a 2 MB cache in ROM, the POST sequence took ~20.03 seconds. Similarly, with a 3 MB cache in ROM the same POST sequence took ~19.79 seconds, while with a 4 MB cache in ROM, the POST took ~18.91 seconds. While the time savings is measured in seconds, seconds are significant in the computing industry today.

Figure 2:
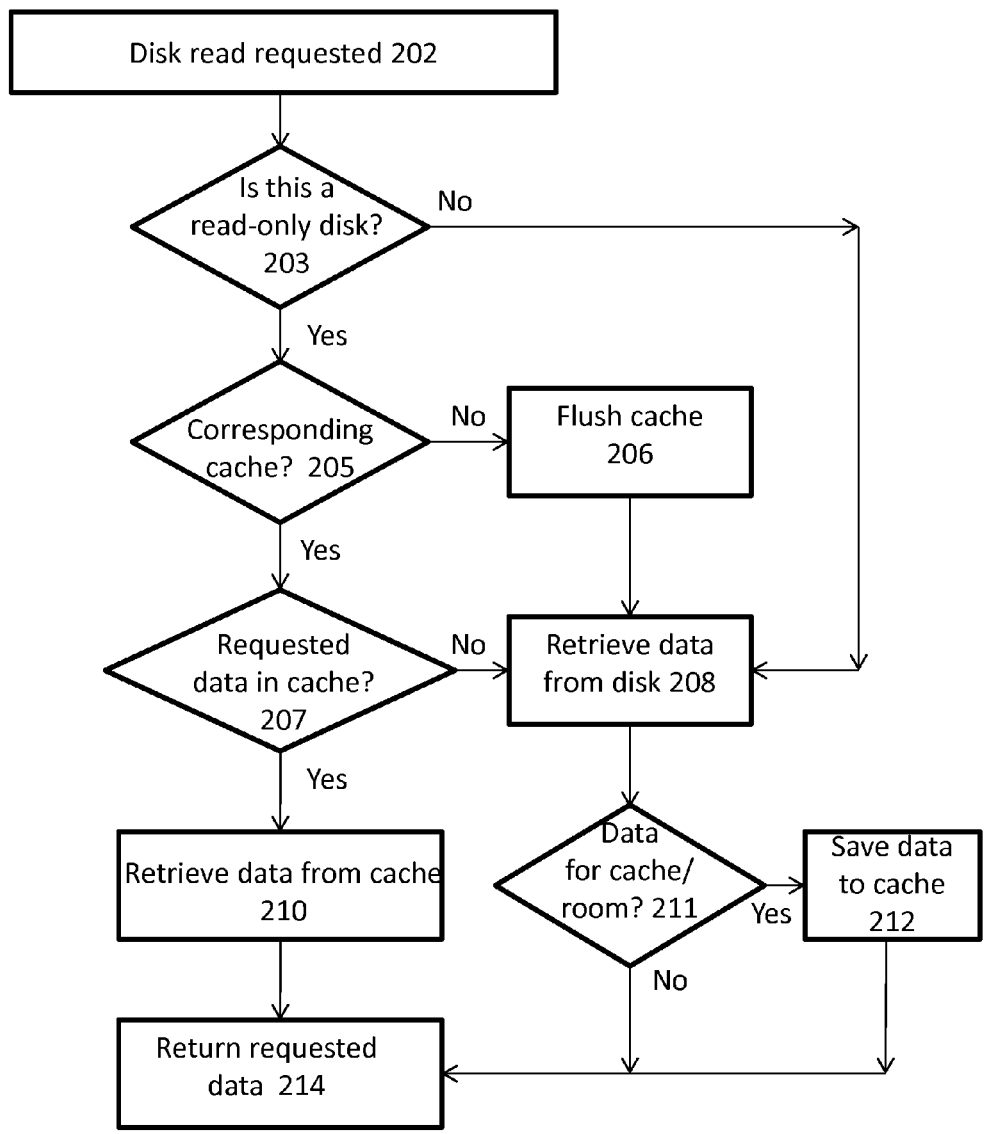
FIG. 2 depicts an exemplary sequence of steps performed by an embodiment of the present invention to cache and/or utilize cache data during a boot sequence.

FIG. 2 depicts an exemplary sequence of steps performed by an embodiment of the present invention to cache and utilize cache data during a boot sequence. When a disk read is requested (step 202), the firmware first determines if this is a request for data from a read-only disk (step 203). If the request is for data from a read-only disk, then the firmware checks if there is a corresponding cache in ROM or other non-volatile memory location for this disk (step 205) by comparing the UUID of the media, checking for the disk-change status bit or similar method. If there is a mismatch between the disk and the cache indicating that the cache does not correspond to the disk, then the cache is flushed (step 206). Data is then retrieved from the disk (step 208) and if there is room in the cache for this data (step 211), the data gets saved to the cache (step 212). The data is then returned (step 214) for use in the boot sequence being executed by the firmware. On the other hand, if there is a corresponding cache for this disk (step 205), then the firmware checks to see if the requested data is in the cache (step 207). If the requested data is in the cache then the requested data is retrieved from cache (step 210) and returned (step 214). Otherwise, if the requested data is not in the corresponding cache, the requested data is retrieved from the disk (step 208). If there is room in the cache for this data (step 211), the data is saved to the cache (step 212) and then returned (step 214). If the disk read is not for a read-only disk (step 203), which would indicated possible coherency issues, then data is retrieved from the disk (208), the check to save the data in the cache fails because the disk was not read-only (step 211), and the read data is returned (step 214).

Figure 3:
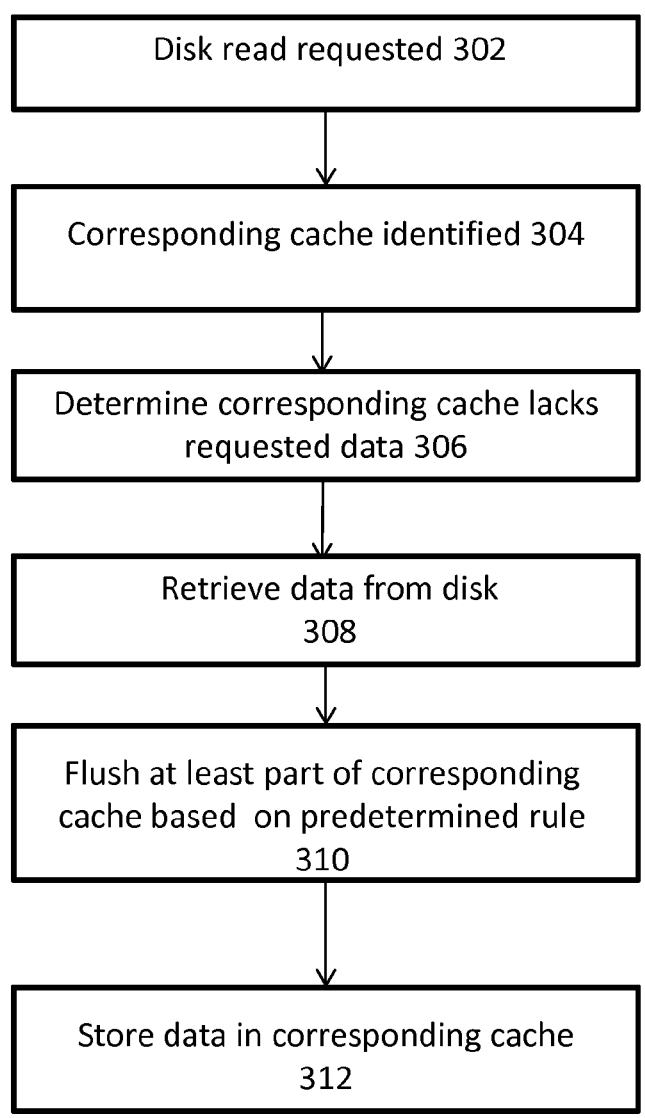
FIG. 3 depicts an exemplary sequence of steps performed by an embodiment of the present invention to create room in a corresponding cache to save requested data.

As discussed above in reference to FIG. 2, after the requested data is retrieved from the disk, a check is performed to determine whether the corresponding cache has enough room to store the data. FIG. 3 depicts an exemplary sequence of steps performed by an embodiment of the present invention to create room in a corresponding cache to save the requested data when the cache initially lacks such room. The sequence begins when a disk read is requested (step 302). A corresponding cache for the disk holding the requested data is identified (step 304). After a determination is made that the cache lacks the requested data (step 306), the requested data is retrieved from the disk (step 308). To make room for the retrieved data in the cache, at least part of the data in the cache is flushed based on a predetermined rule. For example, counters may be added to the data in the cache and incremented with each use. When the need arises to create more room in the cache for the retrieved data, the old data with the lowest usage count may be flushed in favor of new data. Alternatively, the cache may be flushed in whole or in part based on the use of a first-in-first-out (FIFO) method or a first-in-last-out (FILO) method. Additional solutions to a lack of room in the cache include the use of multi-pass methodologies that analyze the usage patterns on multiple passes to generate an optimal cache usage. It should be appreciated that other techniques in addition to those discussed above for determining which data to flush from cache to make room for the requested data are also within the scope of the present invention. Once enough room has been created, the requested data may be stored in the corresponding cache (step 312).

Embodiments of the present invention may be used in a number of different environments where the computing system loads the OS from slow, read-only media. For example, the embodiments may include point-of-sale systems, kiosk systems, embedded systems, and similar systems and devices in addition to personal computing devices such as desktop PCs, laptops and servers that are retrieving code and/or data from slower peripheral devices during their boot sequences.

Although the discussion above has focused on the retrieval of OS bootloader code/data for use in a boot sequence it should be appreciated that the embodiments of the present invention are not so limited. For example, non-OS bootloader code needed by the firmware performing a boot sequence for a computing device that is to be retrieved from a read-only disk that is slow to spin up to speed may also be retrieved by embodiments of the present invention.

Additionally, while the cache has been described above as being located in ROM, in another embodiment, the cache may be located in another non-volatile memory location as long as access to the alternate non-volatile memory location is quicker than retrieving the code and/or data requested by the firmware from the ordinary peripheral device. In such an embodiment, it should be appreciated that access to any such alternate non-volatile memory location would need to be restricted for security purposes similarly to the way in which access to ROM is controlled in order to avoid attacks by unauthorized entities tampering with the requested code/data.

Figure 4:
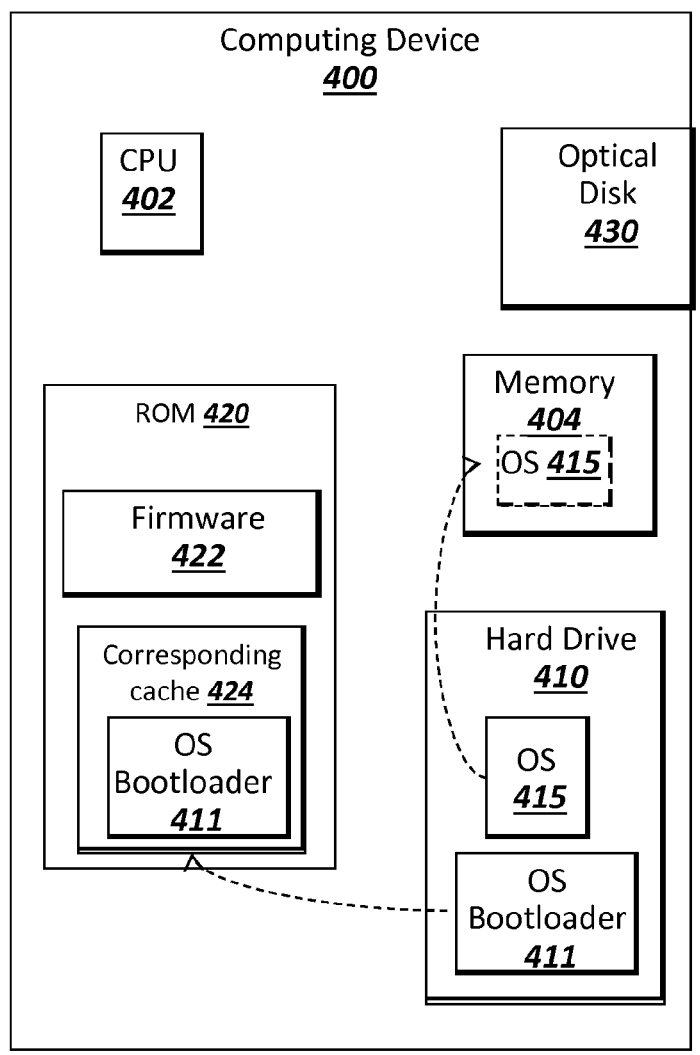
FIG. 4 depicts an exemplary environment suitable for practicing an embodiment of the present invention.

FIG. 4 depicts an exemplary environment suitable for practicing an embodiment of the present invention. A computing device 400 includes a CPU 402. The computing device 400 may be an embedded system, point-of-sale system, kiosk system, PC, laptop computer, tablet computing device, server, smartphone, or some other type of computing device equipped with a processor and firmware executing a boot sequence. The computing device 400 may also include a memory 404 such as Random Access Memory (RAM). An operating system 415 stored on a hard drive 410 in, or in communication with, computing device 400 may be loaded into memory 404 as part of a boot sequence performed by the computing device. The computing device 400 may also include ROM 420 holding firmware 422. The computing device 400 also includes a corresponding cache 424 in non-volatile memory for a disk. In one embodiment, corresponding cache 424 is located in ROM 420. In some cases the system design may incorporate multiple ROM devices. Computing device 400 may also include optical disk 430. As described above, the corresponding cache 424 allows storage of code or data (such as an OS Bootloader) needed during a boot sequence that would ordinarily be retrieved by firmware from optical disk 430 or another slow to access storage location such as a tape drive.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A method for increasing speed of a boot sequence in a computing device:
   beginning a firmware-executed boot sequence for the computing device;
   identifying a disk read request for code or data during the boot sequence;
   determining that the disk read request is requesting a read of a read-only disk;
   determining whether a corresponding cache exists in a system Read Only Memory (ROM) for the computing device, the corresponding cache being a cache identified as corresponding to the read-only disk;
   determining, when the corresponding cache has been determined to exist, whether the requested code or data is in the corresponding cache; and
   retrieving, with the firmware, when the requested code or data has been determined to be in the corresponding cache, the requested code or data from the corresponding cache instead of from the read-only disk, the retrieved code or data used in executing the boot sequence.

2. The method of claim 1 wherein the requested code or data is at least one of operating system (OS) bootloader code or data.

3. The method of claim 1, when a corresponding cache has been determined not to exist, further comprising:
   flushing a cache;
   retrieving the requested code or data from the disk;
   saving the requested code or data to the flushed cache; and
   using the saved code or data in the boot sequence.

4. The method of claim 1, when a corresponding cache has been determined to exist but the requested code or data is not in the corresponding cache, further comprising:
   retrieving the requested code or data from the disk; and
   saving the requested code or data to the corresponding cache.

5. The method of claim 4, further comprising:
   determining, before saving the requested code or data, that the corresponding cache does not have enough room to hold the requested code or data; and
   flushing at least some code or data in the corresponding cache based on a pre-determined rule.

6. The method of claim 5 wherein code or data in the corresponding cache is flushed based on one of a lowest usage count, a first-in-last-out (FILO) method, and a first-in-first-out (FIFO) method.

7. A non-transitory medium holding computer executable instructions for increasing speed of a boot sequence in a computing device, the instructions when executed by a processor causing the computing device to:
   begin a firmware-executed boot sequence for the computing device;
   identify a disk read request for code or data during the boot sequence;
   determining that the disk read request is requesting a read of a read-only disk;
   determine whether a corresponding cache exists in a system Read Only Memory (ROM) for the computing device, the corresponding cache being a cache identified as corresponding to the read-only disk;
   determine, when the corresponding cache has been determined to exist, whether the requested code or data is in the corresponding cache; and retrieve, with the firmware, when the requested code or data has been determined to be in the corresponding cache, the requested code or data from the corresponding cache instead of from the read-only disk, the retrieved code or data used in executing the boot sequence.

8. The medium of claim 7 wherein the requested code or data is at least one of operating system (OS) bootloader code or data.

9. The medium of claim 7, when a corresponding cache has been determined not to exist, the instructions when executed further causing the computing device to:
flush a cache;
retrieve the requested code or data from the disk;
save the requested code or data to the flushed cache; and
use the saved code or data in the boot sequence.

10. The medium of claim 7, when a corresponding cache has been determined to exist but the requested code or data is not in the corresponding cache, the instructions when executed further causing the computing device to:
retrieve the requested code or data from the disk; and
save the requested code or data to the corresponding cache.

11. The medium of claim 10, the instructions when executed further causing the computing device to:
determine, before saving the requested code or data, that the corresponding cache does not have enough room to hold the requested code or data; and
flush at least some code or data in the corresponding cache based on a pre-determined rule.

12. The medium of claim 11 wherein code or data in the corresponding cache is flushed based on one of a lowest usage count, a first-in-last-out (FILO) method, and a first-in-first-out (FIFO) method.

13. A computing device, comprising:
a processor; and
a system Read Only Memory (ROM) holding a collection of firmware for the computing device,
wherein the collection of firmware when executed by the processor performs a boot sequence for the computing device; the boot sequence:
identifying a disk read request for code or data during the boot sequence;
determining that the disk read request is requesting a read of a read-only disk;
determining whether a corresponding cache exists in the system ROM for the computing device, the corresponding cache being a cache identified as corresponding to a read-only disk;
determining, when the corresponding cache has been determined to exist, whether the requested code or data is in the corresponding cache; and
retrieving, when the requested code or data has been determined to be in the corresponding cache, the requested code or data from the corresponding cache instead of from the read-only disk, the retrieved code or data used in executing the boot sequence.

14. The computing device of claim 13 wherein the requested code or data is at least one of operating system (OS) bootloader code or data.

15. The computing device of claim 13 wherein the computing device is one of an embedded system, point of sale system and kiosk system.

16. The computing device of claim 13, where a corresponding cache has been determined not to exist, and the boot sequence further:
flushes a cache;
retrieves the requested code or data from the disk;
saves the requested code or data to the flushed cache; and
uses the saved code or data in the boot sequence.

17. The computing device of claim 13, where a corresponding cache has been determined to exist but the requested code or data is not in not in the corresponding cache, and the boot sequence further:
retrieves the requested code or data from the disk;
determines that the corresponding cache does not have enough room to hold the requested code or data;
flushes at least some code or data in the corresponding cache based on a pre-determined rule; and
saves the requested code or data to the corresponding cache.

18. The computing device of claim 17 wherein code or data in the corresponding cache is flushed based on one of a lowest usage count, a first-in-last-out (FILO) method, and a first-in-first-out (FIFO) method.

* * * * *